United States Patent
Rush, Jr.

(10) Patent No.: US 6,622,144 B1
(45) Date of Patent: Sep. 16, 2003

(54) METHODS AND DATABASE FOR EXTENDING COLUMNS IN A RECORD

(75) Inventor: Ronald A. Rush, Jr., Columbia, SC (US)

(73) Assignee: NCR Corporation, Dayton, OH (US)

(*) Notice: Subject to any disclaimer, the term of this patent is extended or adjusted under 35 U.S.C. 154(b) by 360 days.

(21) Appl. No.: 09/649,698

(22) Filed: Aug. 28, 2000

(51) Int. Cl.[7] .............................. G06F 17/00; G06F 7/00
(52) U.S. Cl. ........................ 707/101; 707/102; 707/100
(58) Field of Search .............................. 707/3, 6, 100, 707/102, 2, 4, 103, 101

(56) References Cited

U.S. PATENT DOCUMENTS

| | | | |
|---|---|---|---|
| 5,261,098 A | | 11/1993 | Katin et al. ................. 395/650 |
| 5,355,493 A | | 10/1994 | Silberbauer et al. ......... 395/700 |
| 5,745,755 A | | 4/1998 | Covey .......................... 395/619 |
| 5,745,889 A | | 4/1998 | Burrows .......................... 707/2 |
| 5,799,310 A | | 8/1998 | Anderson et al. ............ 707/102 |
| 5,826,259 A | | 10/1998 | Doktor ............................ 707/4 |
| 5,832,481 A | * | 11/1998 | Sheffield ......................... 707/4 |
| 5,940,818 A | | 8/1999 | Malloy et al. .................. 707/2 |
| 6,016,497 A | * | 1/2000 | Suver ...................... 707/103 R |
| 6,069,627 A | * | 5/2000 | Conrad et al. ............... 345/866 |
| 6,078,925 A | * | 6/2000 | Anderson et al. ....... 707/103 R |
| 6,338,056 B1 | * | 1/2002 | Dessloch et al. ............... 707/2 |
| 6,366,934 B1 | * | 4/2002 | Cheng et al. ................. 707/513 |
| 6,405,198 B1 | * | 6/2002 | Bitar et al. ..................... 707/6 |
| 6,450,955 B1 | * | 9/2002 | Brown et al. ................ 600/300 |
| 6,463,440 B1 | * | 10/2002 | Hind et al. .................. 707/102 |
| 6,470,343 B1 | * | 10/2002 | O'Brien et al. ............. 707/100 |
| 6,519,597 B1 | * | 2/2003 | Cheng et al. .................. 707/10 |

FOREIGN PATENT DOCUMENTS

GB 2325761 A * 12/1998 ........... G06F/17/30

* cited by examiner

Primary Examiner—Greta Robinson
Assistant Examiner—Susan Rayyan
(74) Attorney, Agent, or Firm—Schwegman, Lundberg, Woessner, Kluth

(57) ABSTRACT

Methods and a database for extending the columns of a record are provided. A record is provided having an extendible column wherein a tokenized string may be stored. Moreover, the tokenized string includes one or more tags, each tag logically representing an extendible column to associate with the record. Further, at least a portion of the tokenized string is delivered upon a request. The tokenized string may conform to at least one of XML, HTML, and SGML. Moreover, updates to the record occur without modifying a table definition associated with the record.

20 Claims, 4 Drawing Sheets

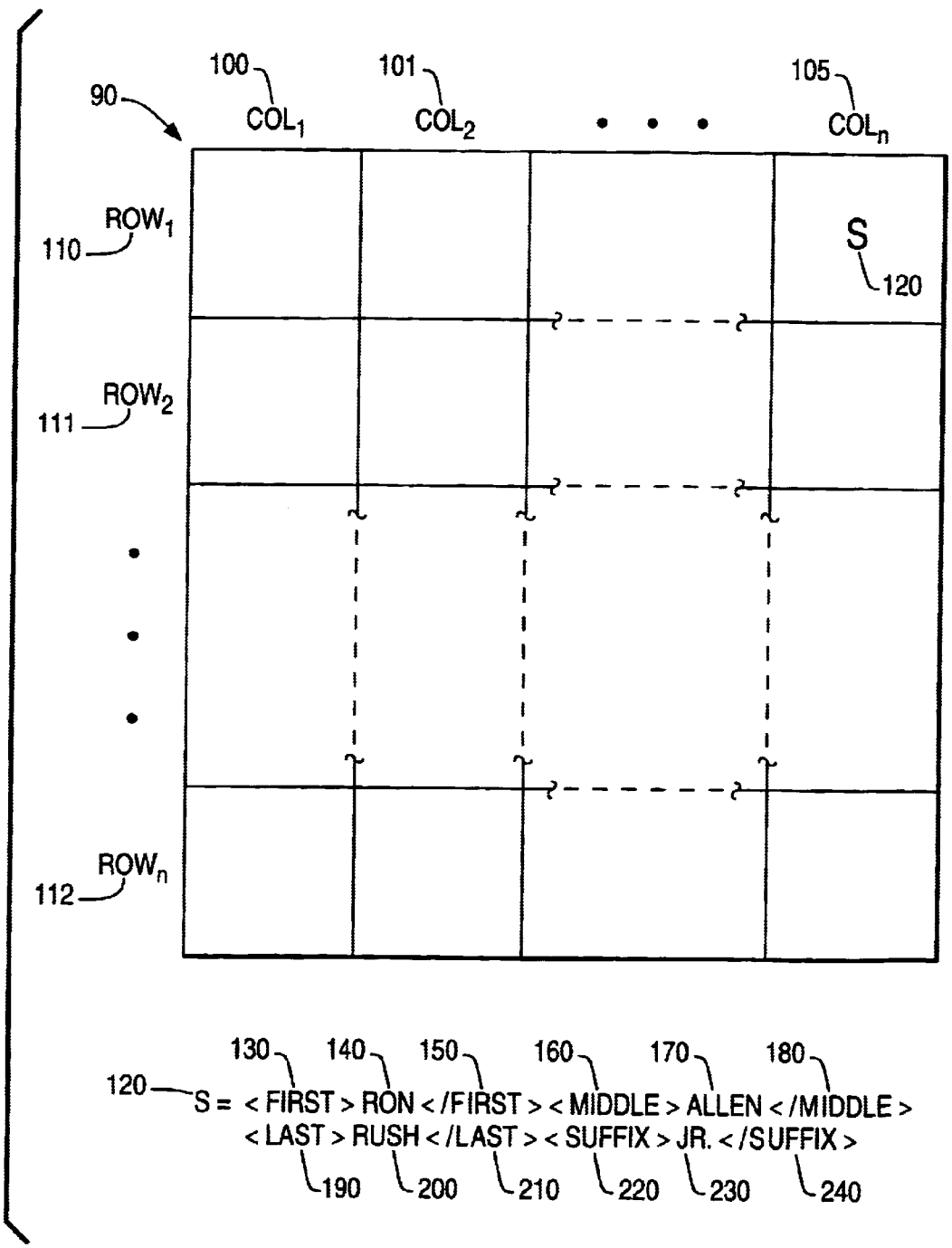

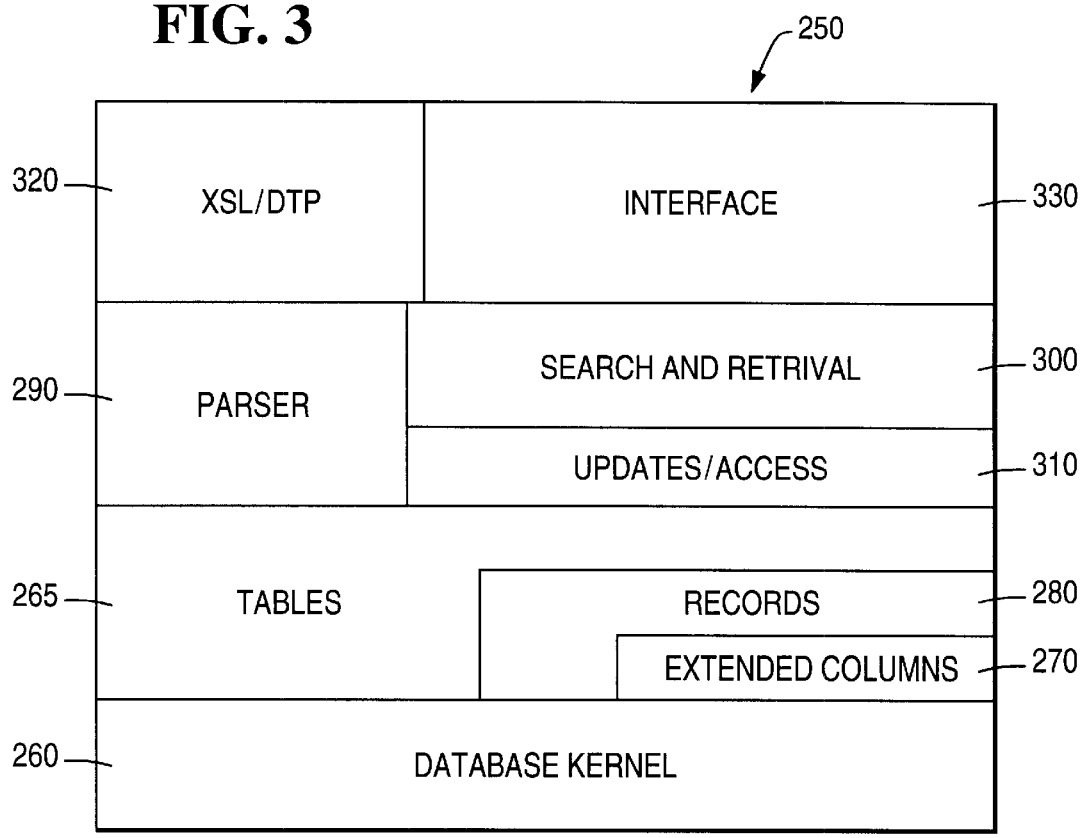
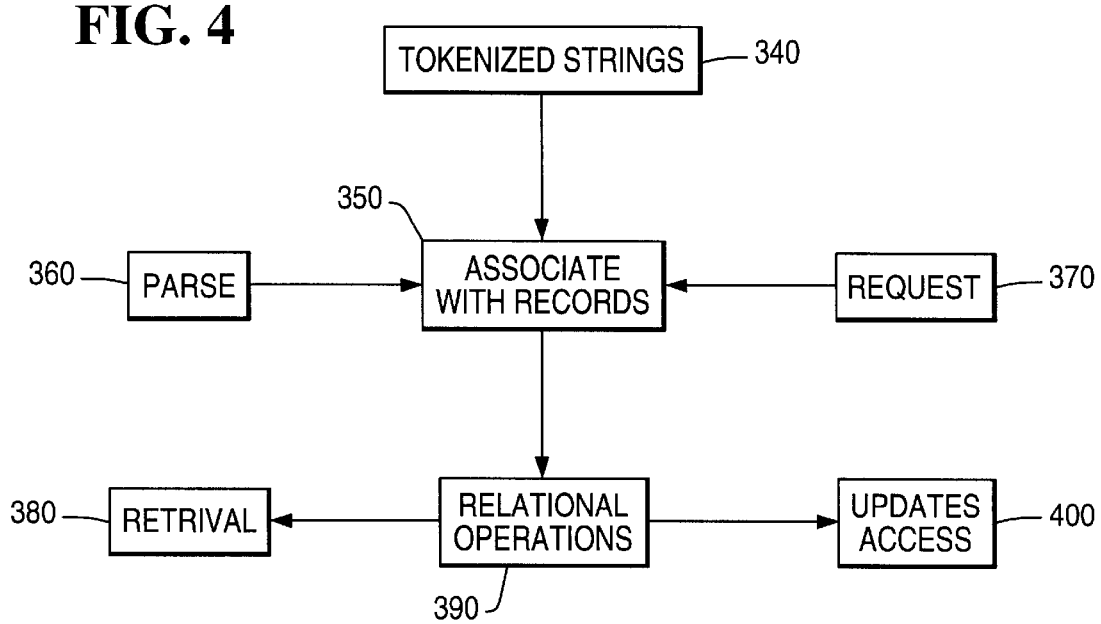

METHODS AND DATABASE FOR EXTENDING COLUMNS IN A RECORD

FIELD OF THE INVENTION

The present invention relates to methods and a database for extending the columns in a record.

BACKGROUND OF THE INVENTION

Permitting disparate database applications to effectively communicate with one another has proved problematic since often each database table will have its own column names which are not compatible with the column names of other external database tables. For example, a relational database table have three columns, a first name column, a middle initial column, and a last name column would not be compatible with a second relational database table having two columns a full name column and an address column. As a result, seamless communication between the database tables cannot occur without developing a customized software application to interface the disparate database tables.

Yet, adding a software application for each disparate database table which is desired to be interfaced is not practical solution. In fact, the quantity of customized software applications, which would need to be developed in order to permit any number of disparate database tables to be interfaced with one another, would be a factorial number. For example, assuming database table one (TB1), database table two (TB2), and master database table (MTB) were all to be interfaced with one another, then the quantity of customized software applications which need to be written would be 3! or 6 (TB→TB2, TB2→TB1, TB1→MTB, MTB→TB1, TB2→MTB, MTB→TB2).

As one skilled in the art will readily appreciate, writing customized software applications to interface disparate database tables is not practical and extremely expensive (e.g., for 4 database tables 4! or 24 customized applications would be required). As a result, other approaches have been attempted such as developing industry standards around data markup languages. These standards may be found in a variety of data formats such as by way of example only, Standard Generalized Markup Language (SGML), Hyper-text Markup Language (HTML), Rich Text Format (RTF), Extensible Markup Language (XML), and the like. Recently, different flavors of XML have emerged such as Extensible Style Sheets Language (XSL), and the like. Although, these data formats and other formats provide guidelines for tagging data content, at present only the XML and XSL standards provide a mechanism for divorcing the procedural description of the data from the descriptive content of the data. For example, a tag inserted into the data such as "<bold>" is a procedural tag since it defines how data is to be displayed, whereas a tag inserted into the data such as "<last-name>" is a descriptive tag since it defines the content of the data. The more a markup language permits procedural tagging in the data, the more difficult it becomes to extract and use the content of the data effectively. Further, if the data is to be used in a different presentation manner altogether than the ability to acquire only an adequate description of the data content is vital. It is often the case that transactional-based operations (e.g. database to database) are concerned with data content and not data presentation.

Moreover, even with transactional-based standards (XML) and XSL which permit data to be more generically parsed by software applications (i.e. reducing the quantity of customized software applications), often the descriptive tags used to define the data content will not be consistent with an application that desires to interface with the data content. For example, a database table with two columns a full name column and an address column, still cannot effectively interface with a data stream extracted from a database table having three columns a first name column, a middle initial column, and a last name column, when the extracted data uses descriptive tags which are not recognizable by the database table that is desired to be interfaced. As a result, even industry standards have not alleviated the problem associated with permitting disparate database tables to communicate with one another.

Past attempts to permit disparate database tables to interface with one another rely on the assumption that a target table is required to have prior knowledge about a source table's columns (e.g. column names and data types) prior to any storage of the initial table's column data in the target table's columns. As will be detailed in the description that follows, this prior knowledge by the target table is not only not necessary but not desirable.

SUMMARY OF THE INVENTION

Accordingly, an object of the invention is to provide methods and a database for extending the columns in a record. By augmenting the existing columns associated with a record to include one to many additional logical columns which are readily identifiable, disparate database tables may effectively communicate with one another without the need for the development of a multitude of customized software applications. If a data stream is presented to be associated with a target record, wherein identifiable columns within the data stream are not defined in the target record, no attempt is made to identify the columns of the data stream, rather, the data stream is stored in an extended column in the record and processed when necessary (e.g. a user-issued query against the target record for columns identified in the data stream). In this way, a record may be extended with multiple columns without the need to modify the table definition to which the record is associated, thereby permitting a single database table to accept and utilize a plurality of disparate database tables.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods and a database for extending columns in a record are provided.

A method of extending a single column of a record to support multiple columns is provided, comprising providing a record with one or more columns including an extended column and receiving a tokenized string associated with the extended column. Further one or more token tags are used to logically represent one or more additional columns within the record.

Moreover, a database capable of representing multiple columns from a single column is provided, comprising one or more records, each record having one or more columns and each record having an extended column. A tokenized string is also provided including one or more token tags operable to be received in the extended column for each record, wherein each unique token tag logically represents a new column in each record.

Lastly, a method of warehousing and delivering data is provided, comprising providing one or more records, each record having an extended column, receiving a tokenized string associated with each extended column, wherein the tokenized string includes one or more tags, each tag logically representing an additional column for each record. Further, at least a portion of the tokenized string is delivered upon a request.

Still other aspects of the present invention will become apparent to those skilled in the art from the following description of an exemplary embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings:

FIG. 2 depicts a schematic diagram of a database capable of representing multiple columns from a single column;

FIG. 3 depicts a block diagram of database capable of representing multiple columns from a single column;

FIG. 4 depicts a flow diagram of a method of warehousing and delivering data.

DETAILED DESCRIPTION

The present invention provides methods and a database for extending the columns of a record. One embodiment of the present invention is implemented by augmenting the NCR Teradata database using XML data markup language with the methods and database interfaces written in C, C++ and SQL programming languages. However, as one skilled in the art will readily appreciate alternative database technologies, data markup languages, and programming languages (now known or hereafter developed) may also be readily employed.

Initially, a database table definition is established for purposes of defining the fields or columns associated with a record of the table. Updates and access to the table are restricted by the table definition. A single database may have one to many tables, with each table having its own table definition.

For purposes of illustration only consider a single database table, the table includes a table definition having only two columns per record which may be defined as follows:

column 1:
  full-name;
  string;
  NONE;
column 2:
  marital-status;
  boolean; and
  N.

Where column 1 is defined by a tag labeled "full-name" which is a string data type having an initial value of "NONE," and where column 2 is defined by the tag labeled "marital-status which is a boolean data type having an initial value of "N." Access to the table is defined by locating cells of the table identified by column and row entries. Any single row is referred to as a record, and the relationship of the columns within the record are referred to as a tuple.

Moreover, it is typically the case that at least one column in the table is reserved for a unique key, such that no two values associated with the unique key column are identical within a single table. In this way, assuming full-name is a unique key in the present example, a query could be done on a specific last name against the table, and the entire row matching the full-name used as a query will be returned to the requester. In the present example, the returned row comprises two columns, namely the full-name and the marital-status. Further, assuming the value associated with the full-name column is "RUSH, RONALD" and the value associated with the marital-status column is "Y," then the row "RUSH, RONALD Y" also identifies a tuple for the table relationship.

By creating a new column in the record, and modifying at least initially the table definition to accommodate this new column, the new column may be used to support a record having a variable number of additional columns and column definitions. These additional columns may be added without the need to further modify the table definition associated with the record. Moreover, as one skilled in the art will appreciate, multiple columns may be created with each column supporting the expansion of one to many additional logical columns within the record.

Figure 1:
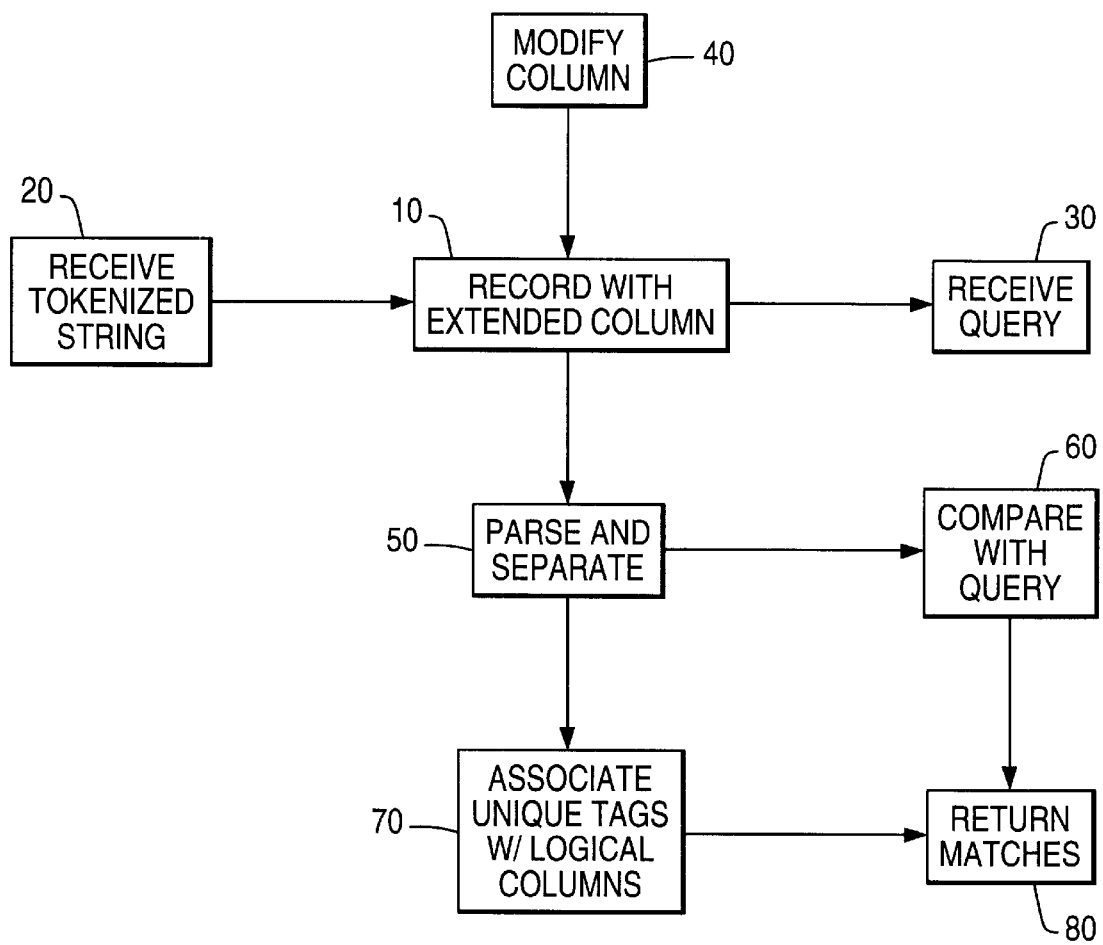
FIG. 1 depicts a flow diagram of a method of extending the columns of a record.

FIG. 1 illustrates a flow diagram of one embodiment for a method of extending the columns of a record. Initially, in step 10 a record is provided and the record associated with a table definition that supports a generic column is identified, by way of example only, as an extended column. This extended column is a string type having a variable length which thereby permits the extended column to house data in a multitude of varying formats. Further, in one embodiment the extended column accepts a tokenized string comprising one or more token tags. Each unique token tag may be used to logically represent an additional column within the record. However, as one skilled in the art will appreciate token tags contained in the tokenized string which are indicative of presentation attributes used to define the presentation of the data, such as bolding, indentation, and the like, need not be included as additional columns to associate within the record.

Separation and identification of the individual token tags within the tokenized string is achieved by parsing and separating the tokenized string contained within the extended column in step 50. Parsing tokenized strings for tags is well known in the art and a variety of off-the-shelf packages exist to provide parsing capabilities, particularly with SGML, HTML, and XML compliant tokenized strings. Some of these packages include, by way of example only, Arbortext, Xmetal, Exoterica, and the like. Moreover, standard programming languages provide parsing capabilities which make the development of a parsing application easily customizable. Some of these programming languages include, by way of example only, C, C++, Flex, Perl, Yacc, Lex, and the like.

Furthermore, with data formats such as SGML and XML there exists language defined syntaxes and grammars which may be defined in files referred to as data type definition files (DTDs), these small compact files are used by off-the-shelf packages to validate and parse strings which should conform to the syntax and grammar rules defined in the DTDs. Also, files may be provided in XSL formats which provide customizable presentation rules to enforce against a particular data stream or tokenized string. In this way, the data content remains separated and segmented from the data presentation, so that the presentation may be customized by individual applications and yet the data content remains generic and portable.

By way of example only, an XML compliant tokenized string, is received and housed in the extended column in step 20. The tokenized string is parsed using MICROSOFT INTERNET EXPLORER 5.0 in step 50, and the uniquely identified data content related token tags are associated with additional logical columns of the record in step 70. However, this parsing need not occur against the tokenized string until some use or access of the extended column is required. In this way, a single software application deploying off-the-shelf software packages is customized and used to parse and associate data content tags occurring in the tokenized string with additional logical columns within the record. This single generic application permits, the interfacing of a variety of records with disparate column information to be housed and used in a single record without the need to continually modify the table definition associated with the record. As one skilled in the art will readily appreciate, this effectively allows multiple disparate databases to seamlessly communicate or transact with one another without the need to establish elaborate and database specific software applications for each disparate database.

Referring again to FIG. 1, since the table definition associated with the record is merely a generic string, at any point the tokenized string housed within the extended column of the record may be entirely changed or modified in step 40 without the need to alter the original table definition to accommodate the change. Moreover, in step 30 the table may receive a query against the extended column of the record, parse and separate the unique data content tags from the extended column in step 50, and compare the query term(s) as appropriate in step 60 with any matches with are detected returned in step 80. For example, a search query such as "first-name=Ronald" issued against an extended column of a record containing the tokenized string of "<first-name> Ronald</first-name><last>Rush</last>" would result in a match on the tag "<first-name>" which is logically associated with an extended column labeled "first-name" at step 70.

Further, as one skilled in the art will readily appreciate the tokenized string could easily be automatically extracted from one database table and stored in the extended column of a record of another disparate database table. For example, assuming a first database table has records with three columns including labels defined as "first-name," "middle-initial," and "last-name" then records and the content associated with the records could be easily extracted and tokenized into a string having the format of "<first-name>F</first-name><middle-initial>M</middle-initial><last-name>L</last-name>" where F is a value contained within the first-name column, M is a value contained within the middle-initial column, and L is a value contained within the last-name column. In this way, tokenizing and creating a string prior to housing it within an extended column of a record having only two columns (e.g. "account" and "extended"), is easily achieved. Further, parsing the tokenized string for the individual tags is easily achieved and directly associated with the column labels of a previous disparate database table.(e.g. associating "<first-name></first-name>" with "first-name"). In this way seamless transacting between disparate database tables is easily achievable.

FIG. 2 illustrates one embodiment of a schematic diagram for a database capable of representing multiple columns from a single column. The table defining the database is depicted in FIG. 2, 90 which includes rows 110–112 (e.g., records and columns 100–105 (e.g., fields). Column 105 is identified as a extensible column which is defined in an associated table definition as being a variable length string. By way of example only, S 120 is a tokenized string contained within the extensible column 105, which is further detailed in FIG. 2.

The tokenized string S 120, in this example, includes 4 unique content data tags, namely "<first>" 130, "<middle>" 160, "<last>" 190, and "<suffix>" 220. The individual values associated with each of these tags are "Ron" 140, "Allen" 170, "Rush" 200, and "Jr." 230, respectively. The termination of the content tags are delineated with ending content tags, namely "</first>" 150, "</middle>" 180, "</last>" 210, and "</suffix>" 240. Each of the content data tags is representative of columns within the records 110–112 of database table 90. In this way, the extensible column 105 includes a tokenized string S 120 which is logically representative of not one column but 4 additional columns, namely "<first>" 130, "<middle>" 160, "<last>" 190, and "<suffix>" 220. As one skilled in the art will appreciate, this architectural layout provided by way of example in FIG. 2 permits a single database table, and correspondingly a database, to effectively utilize and interface to a variety of disparate database tables and databases without the need to revise the database table definitions.

FIG. 3 illustrates one embodiment of a block diagram for database capable of representing multiple columns from a single column. Database architecture 250, provides a database kernel 260 wherein multiple tables 265 exist having records 280. The records 280 each having at least one column identified as an extended column 270 defined in the table definition associated with the database tables 265 as a varying length string. A parser 290 provides a mechanism to parse the tokenized strings housed inside the extended columns 270, such that the tags contained within the tokenized string is logically associated with extended columns within the records 280.

Moreover, search and retrieval 300, updates and access 310 occurring against the extended columns 270 are provided. The parser 290 uses the syntactical rules associated with a DTD or XSL file 320 to parse and logically associate the extended columns with multiple columns with the records 280. Finally, an interface 330 provides access to requesters or users of the database architecture 250. As one skilled in the art will appreciate users need not be individuals but may be any entity or application which is capable of gaining electronic access to a database. An exemplary interface is a web browser permitting access to the database using standard SQL commands, however, other interfaces and commands could be provided. Moreover, DTDs and XSLs are not required, as any number of syntax defining grammars could be deployed including ad hoc grammars or conversion programs.

FIG. 4 illustrates one embodiment of a flow diagram for a method of warehousing and delivering data. Records are defined by a table definition such that at least one column in the record is an extensible column capable of housing tokenized strings which are received in step 340. The tokenized strings are parsed into data content tags in step 360 and associated with the records in step 350. Once each uniquely occurring data content tag is parsed and logically associated with a column within the records, a request may be received in step 370 from a requester or user in which relational operations may be performed in step 390, such as retrieval in step 380 and updates/access in step 400. As discussed above, users need not be physical but may be any entity which is capable of gaining access to the database records. Moreover, parsing may occur after a request is received.

Figure 5:
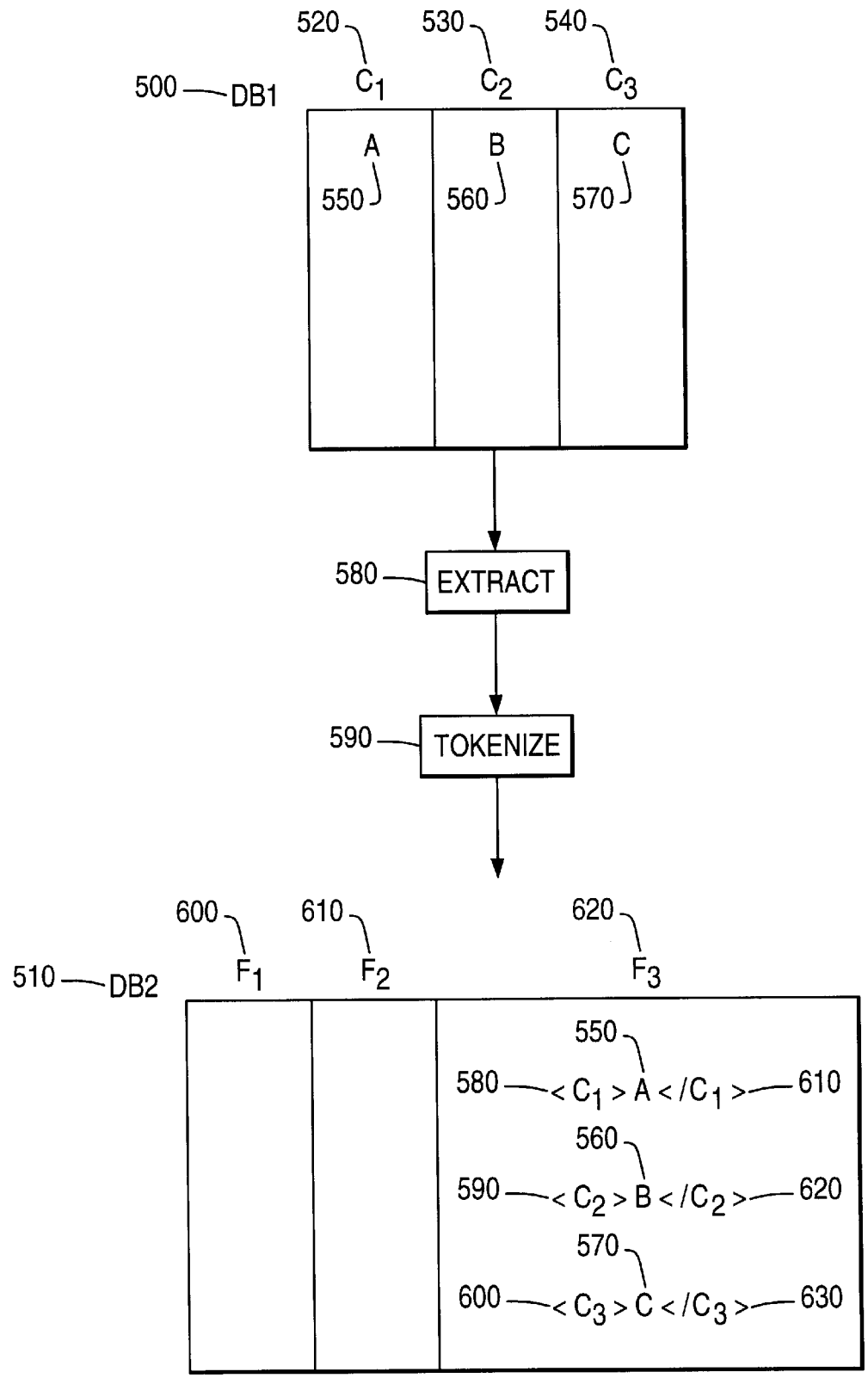
FIG. 5 depicts a schematic of using a single column to store columns associated with a disparate database.

FIG. 5 illustrates one embodiment of a schematic for using a single column to store columns associated with a disparate database. In FIG. 5 database table DB1 500 includes a table definition having 3 columns, C1 520, C2 530, and C3 540. Furthermore, within these columns there are 3 values associated with the columns, namely A 550, B 560, and C 570. DB1 500 is accessed by a utility which extracts in 580 the columns and their corresponding values. As previously discussed, extraction could be a query or any utility having access to the DB1 500 and capable of retrieving the columns and the column values of DB1 500. The columns are then tokenized in 590 such that the column labels C1 520, C2 530, and C3 540 are readily identifiable with tags that directly correspond to their original labels. For example, column label C1 520 is tokenized by surrounding the label C1 with the characters "<" and ">" (e.g. "<C1>" 580). After enclosing the column labels with special characters; thereby creating tags, the values following the tags, which are contained within the columns of DB1 500, are inserted serially into the constructed tokenized string. For example, the value of C1 520 is A 550 and it follows the token tag "<C1>" 580 serially in the tokenized string (e.g. "<C1>A"). Finally, after the value of a column is inserted into the tokenized string an ending tag is inserted into the tokenized string which permits easy parsing and extracting of the token tags and their corresponding values. For example, following the insertion of A 550 an ending tag "</C1>" 610 is inserted serially into the tokenized string.

Once the extracted columns and values are tokenized from DB1 500, insertion into a disparate database table DB2 510 of the tokenized string is easily achieved, such that a special column defined as a varying length string in DB2 510, namely F3 620 may house the tokenized string which logically represents the columns associated with DB1 500. In this way the records of DB2 510 are capable of housing and using the columns of the records of DB1 500 without having any prior knowledge about the specific aspects of the table definition and column label names associated with DB1 and without modifying the table definition of DB2 510. As one skilled in the art will appreciate this permits disparate databases to be stored and interfaced from a single database architecture.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the attached claims.

What is claimed is:

1. A method of extending a single column of a record to support multiple columns, comprising:

providing a record with one or more columns including an extended column, wherein the record is associated with a first database table;

receiving a tokenized string associated with the extended column, wherein the tokenized string represents column labels for a disparate database table; and using one or more token tags from the tokenized string to logically represent one or more additional columns within the record.

2. The method of claim 1, wherein the tokenized string conforms to extended markup language.

3. The method of claim 1, further comprising:

parsing the tokenized string to separate one or more of the token tags.

4. The method of claim 1, further comprising:

receiving a query for a desired field; and searching the extended column by parsing one or more of the token tags from the tokenized string and comparing each token tag with the desired field.

5. The method of claim 4, further comprising:

delivering a portion of the tokenized string which follows a desired field if the desired field is found in the tokenized string.

6. The method of claim 1, wherein the extended column is updated with a modified tokenized string without altering a table definition for the record.

7. The method of claim 1, wherein the tokenized string is parsed using one or more rules included in a data type definition file which defines the tokenized string.

8. A database capable of representing multiple columns from a single column, comprising:

one or more records, each record having one or more columns and each record having an extended column; and a tokenized string including one or more token tags operable to be received in the extended column for each record, wherein each unique token tag logically represents a new column in each record, and wherein each unique token tag is associated with a column label from a disparate database table.

9. The database of claim 8, wherein the tokenized string conforms to extended markup language.

10. The database of claim 8, further comprising:

a set of executable instructions operable to parse the tokenized string to isolate the token tags.

11. The database of claim 8, further comprising:

a set of executable instructions operable to compare a query term with each token tag and delivering a portion of the tokenized string which follows each token tag that matches the query term.

12. The database of claim 8, wherein the tokenized string includes one or more references to video files, audio files, image files, and character data.

13. The database of claim 8, wherein each of the tokenized strings are operable to be modified and updated without altering a table definition associated with the records.

14. The database of claim 8, wherein a grammar associated with the tokenized strings is defined in at least one of a data type definition file and an extended style sheet language file.

15. A method of warehousing and delivering data, comprising:

providing one or more records, each record having an extended column, and wherein the one or more records are associated with a first database;

receiving a tokenized string associated with each extended column, wherein the tokenized string includes one or more tags, each tag logically representing an additional column for each record, and wherein each of the one or more tags represent a column label for a disparate database table; and delivering at least a portion of the tokenized string upon request.

16. The method of claim 15, further comprising:

parsing the tokenized string to identify each unique tag.

17. The method of claim 15, wherein the tokenized string conforms to at least one of extensible markup language, hypertext markup language, and standard generalized markup language.

18. The method of claim 15, wherein a grammar associated with the tokenized string is defined in at least one of a data type definition file and an extended style sheet language file.

19. The method of claim 15, further comprising:

performing one or more relational database operations on the portion of the tokenized string delivered in response to the request.

20. The method of claim 15, further comprising:

updating the tokenized string without modifying a table definition associated with the records.

* * * * *